United States Patent [19]

Halmi

[11] Patent Number: 4,528,847
[45] Date of Patent: Jul. 16, 1985

[54] FLOW METERING DEVICE WITH RECESSED PRESSURE TAPS

[75] Inventor: Dezsoe Halmi, Cranston, R.I.

[73] Assignee: D. Halmi And Associates, Inc., Pawtucket, R.I.

[21] Appl. No.: 539,043

[22] Filed: Oct. 4, 1983

[51] Int. Cl.³ .......................... G01F 1/42; G01F 1/44
[52] U.S. Cl. .................................. 73/195; 73/861.61; 73/861.64
[58] Field of Search ..................... 73/195, 196, 861.52, 73/861.61, 861.63, 861.64; 138/44

[56] References Cited

U.S. PATENT DOCUMENTS

| | | | |
|---|---|---|---|
| 1,850,030 | 3/1932 | Pardoe | 138/44 X |
| 2,127,501 | 8/1938 | Dall | 73/861.61 |
| 2,704,555 | 3/1955 | Dall | 73/861.13 X |
| 2,984,105 | 5/1961 | Nagel et al. | 73/861.04 X |
| 4,231,262 | 11/1980 | Boll | 73/861.04 |

*Primary Examiner*—Charles A. Ruehl
*Attorney, Agent, or Firm*—Salter & Michaelson

[57] ABSTRACT

A flow metering device of the type operative for producing a pressure differential comprises a shaped tubular member having sequentially disposed inlet, converging, and throat sections, and a downstream diverging section for energy recovery. Inner annular recesses, preferably having substantially sharp leading edges, are provided in the interior of the device in or adjacent the inlet and throat sections, and pressure taps for sensing the fluid pressures in the inlet and throat sections communicate with the interior of the device through the recesses. The taps are preferably positioned adjacent the leading edges of the respective recesses so that they are shielded from the direct flow of fluid in the device to provide true static pressure readings which are unaffected by the configurations of the inner ends of the taps. Accordingly, highly accurate operations can be effected with the device using bench calibrated discharge coefficients. In the preferred embodiment of the device, a third tap is provided in the converging section so that a magnified differential between the inlet and converging sections can also be monitored.

6 Claims, 4 Drawing Figures

FLOW METERING DEVICE WITH RECESSED PRESSURE TAPS

BACKGROUND AND SUMMARY OF THE INVENTION

The instant invention relates to flow metering devices and more particularly to a flow metering device of the type which is operative for determining the flow rate of a fluid in a conduit by measuring the pressure differential produced as the fluid passes through a restriction in the conduit.

The use of flow metering devices of the pressure differential producing type is widely known, and devices of this general type have been heretofore available in a variety of configurations. The U.S. patents to Terrell U.S. Pat. No. 2,868,013; Schroder U.S. Pat. No. 2,863,318; Shaffer U.S. Pat. No. 2,872,810; O'Keeffe U.S. Pat. No. 3,013,432; Halmi U.S. Pat. No. 3,733,901; Halmi U.S. Pat. No. 3,733,902; and Bradham U.S. Pat. No. 4,174,734; and the U.K. patent to Nathan Pat. No. 473,562, are exemplary in this regard and represent the closest piror art to the instant invention of which the applicant is aware. The classical venturi tube is also exemplary of this type of device and for years has found wide acceptance in industry. Generally, the classical venturi tube comprises an elongated shaped tubular member having a substantially straight inlet section, an elongated tapered converging section, a substantially straight throat section of reduced cross section, and a downstream diverging section (energy recovery section). Pressure sensing taps are provided in the inlet and throat sections for sensing the pressure differential produced as the cross-sectional area of the flow is reduced by the tube. In an ideal situation, the energy content of a fluid (the sum of the kinetic and potential energies of the fluid) remains constant as the fluid passes through a venturi tube. However, since the velocity of the fluid must increase as the cross sectional area of the flow is reduced in the throat section of the tube, the kinetic energy of the fluid is increased in the throat section, and therefore the potential energy of the fluid in the throat section is correspondingly reduced. Theoretically, the pressure taps in the inlet and throat sections sense static pressures which are related to the potential energy of the fluid in these sections. Accordingly, the pressure differerential between the inlet and throat sections is related to the difference in the potential energy of the fluid in these sections and inversely related to the difference in the kinetic energy of the fluid in these sections. As a result, in an ideal situation, the rate of the flow of a fluid through a venturi tube can be calculated from the pressure differential between the inlet and throat sections of the tube and the inlet and throat diameters of the tube using an ideal flow equation.

In practice, however, the actual rate of the flow of a fluid through a venturi tube has proven to be somewhat different from the theoretical value calculated in an ideal flow equation. Therefore, in actual practice when high accuracy has been required it has proven to be necessary to multiply the theoretical flow rate by an empirically determined discharge coefficient which must be determined by means of a flow calibration (a physical measurement of the amount of fluid passing through the tube over a specified period of time) in order to establish the actual flow rate of the fluid through the venturi tube. It has been found that relatively high accuracy can be obtained in this manner and that an empirically determined discharge coefficient compensates for the following physical characteristics:

(1) the effects of the Reynolds number as the fluid velocity changes;
(2) the effects of energy losses in the device;
(3) the effects of sheer forces produced by the fluid as it passes the taps causing the formation of vorticies therein;
(4) the effects of tap configurations, including machining irregularities, burrs, edge sharpness, hole size, surface finish, etc; and
(5) the effects of the interior configuration of the venturi tube per se in the areas thereof adjacent the inlet and throat taps.

It will be seen that the above factors can be grouped into two general categories; factors (1) and (2) which relate to the basic configuration of the venturi tube, including the various dimensions thereof, and factors (3) through (5) which relate to the interactions between the fluid and the pressure taps and which therefore vary with each specific venturi tube. Accordingly, while the effects of factors (1) and (2) can be uniformly established for all venturi tubes of a particular dimension and configuration, the effects of factors (3) through (5) vary with each specific venturi tube. While it has been found that the effects of factors (3) through (5) can be reduced by machining venturi tubes with precision tolerances, heretofore it has not been possible to eliminate the effects of these factors. As a result, heretofore it has not been possible to provide highly accurate discharge coefficients with bench calibrations for venturi tubes, and it has been necessary to individually determine discharge coefficients for venturi tubes by making flow calibrations in applications where high accuracy has been required. Heretofore this has been a major problem in the manufacture of venturi tubes and has substantially increased manufacturing costs.

The above factors have also affected other types of flow metering devices and have necessitated individual discharge coefficient determinations for a wide variety of the heretofore available flow metering devices whenever high accuracy has been required. In fact, virtually all of the heretofore available flow metering devices which have relied on pressure readings to determine flow rates have had this problem, primarily because of the interactions between the fluids passing through the tubes and the pressure sensing taps in the tubes.

The instant invention provides a novel flow metering device which is operative for providing accurate flow readings with high energy recovery using bench calibrated discharge coefficients, and therefore the device of the instant invention can be used without requiring flow calibrations for high accuracy applications. Specifically, the flow metering device of the instant invention comprises a shaped tubular member having inlet, converging, and throat sections, and a downstream diverging section for high energy recovery and having pressure sensing taps for sensing the pressure in the inlet and throat sections. In contrast to the heretofore known flow metering devices, however, the device of the instant invention has preferably two annular recesses in the interior thereof, one of the recesses communicating with the inlet section, and the other communicating with the throat section of the device. The pressure sensing taps for the inlet and throat sections are disposed within the recesses, preferably adjacent the respective leading edges of the recesses, and hence the taps only communicate with a fluid passing through the device through the respective recesses. Accordingly, there is virtually no interaction between the moving fluid passing through the device and the pressure sensing taps so that the configurations of the taps are inconsequential. As a result, the pressure sensing taps have very little effect on the discharge coefficient of the device, and really the only factors which influence the discharge coefficient are the effects of the Reynolds number of the fluid as the velocity of the fluid changes and the effects of the energy losses in the device. Since these effects are relatively consistent for all devices of a particular dimension and configuration, a single discharge coefficient can be determined with one flow calibration, and this discharge coefficient can be used to provide bench calibrated discharge coefficients for other devices of the same dimension and configuration. Accordingly, it is seen that by positioning the pressure sensing taps in annular recesses, the effects of the taps on the discharge coefficient of the device can be minimized so that accurate flow readings can be obtained without independently determining discharge coefficients for each device. In addition, since the taps in the inlet and throat sections are static fluid pressures, it is possible to calculate venturi-type adiabatic gas expansion factors for the devices of the instant invention so that they can be used for gases as well as for liquids.

In the preferred embodiment of the device of the instant invention, a third pressure sensing tap is provided in the converging section for sensing the fluid pressure therein. In this regard, while metering devices have heretofore been available, such as the devices commonly referred to as flow tubes which have had converging section taps, the concept of providing three pressure sensing taps, one in the inlet section, one in the converging section, and one in the throat section, provides specific advantages over the prior art devices. When a flow measuring device is embodied with three taps in this manner, two separate differential pressure readings can be monitored to provide improved accuracy in flow readings. Specifically, a first differential pressure between the tap in the inlet section and the tap in the throat section is monitored, this reading being similar to the reading obtained in the flow measuring device when it is embodied with only two taps as hereinabove described. A second differential pressure reading is also observed between the tap in the inlet section and the tap in the converging section, this reading being similar to the type of reading obtained from a conventinal flow tube and being influenced by the dynamic pressure of the fluid in the converging section which causes an aspirating or suction effect on the third tap to produce a magnified differential pressure reading. By observing the relationships between the two differential pressure readings, highly reliable and accurate flow measurements can be determined with the device. Specifically, since a flow reading can be determined by measuring the pressure differential between the inlet and throat taps and applying this reading in a flow equation using a bench calibrated discharge coefficient, the differential observed between the inlet and throat taps can be used to correlate the device for operation with the differential pressure reading observed between the inlet and converging section taps. Accordingly, the device can be operated utilizing the inlet and converging section taps so that a magnified differential pressure reading is observed for increased sensitivity; but because of the unique features of the recessed inlet and throat taps, independent flow calibrations are unnecessary. Further, by monitioring both the pressure differential between the inlet and throat taps and the pressure differential between the inlet and converging section taps, it is possible to detect malfunctions in the device, such as deposit build-ups, etc.; because in most instances a malfunction will cause a change in the interrelation between the two differential pressure readings.

Accordingly, it is a primary object of the instant invention to provide a flow measuring device with high energy recovery wherein the readings produced by pressure sensing taps in the inlet and throat sections of the device are unaffected by tap configurations.

Another object of the instant invention is to provide a flow measuring device which can be bench calibrated with high accuracy.

A further object of the instant invention is to provide a flow measuring device having inlet and throat pressure sensing taps which communicate with the inlet and throat regions of the device through annular recesses, respectively.

A still further object of the instant invention is to provide a flow measuring device having pressure sensing taps in the inlet, converging, and throat sections thereof.

An even still further object of the instant invention is to provide a flow measuring device wherein it is possible to determine when it is malfunctioning without dismantling the device.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

DESCRIPTION OF THE DRAWINGS

In the drawings which illustrate the best mode presently contemplated for carrying out the present invention.

DESCRIPTION OF THE INVENTION

Figure 1:
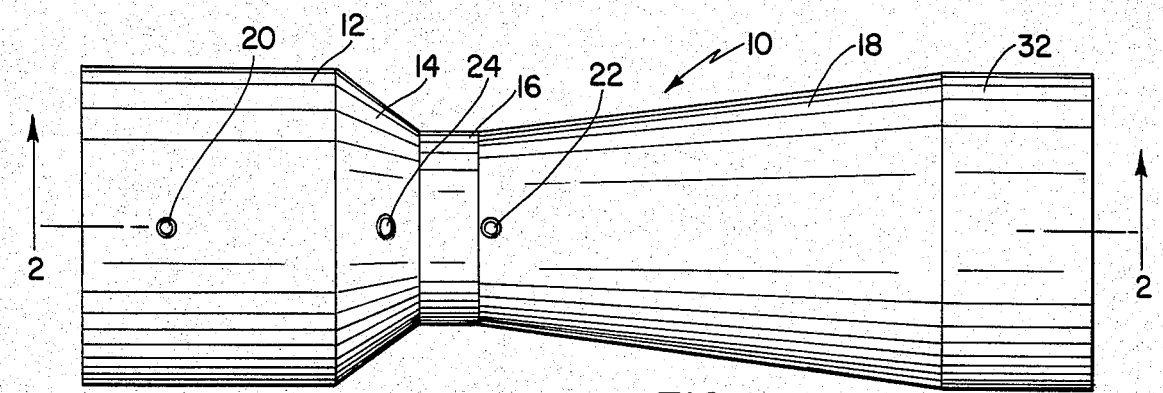
FIG. 1 is a side elevational view of a first embodiment of the flow measuring device of the instant invention.
Figure 2:
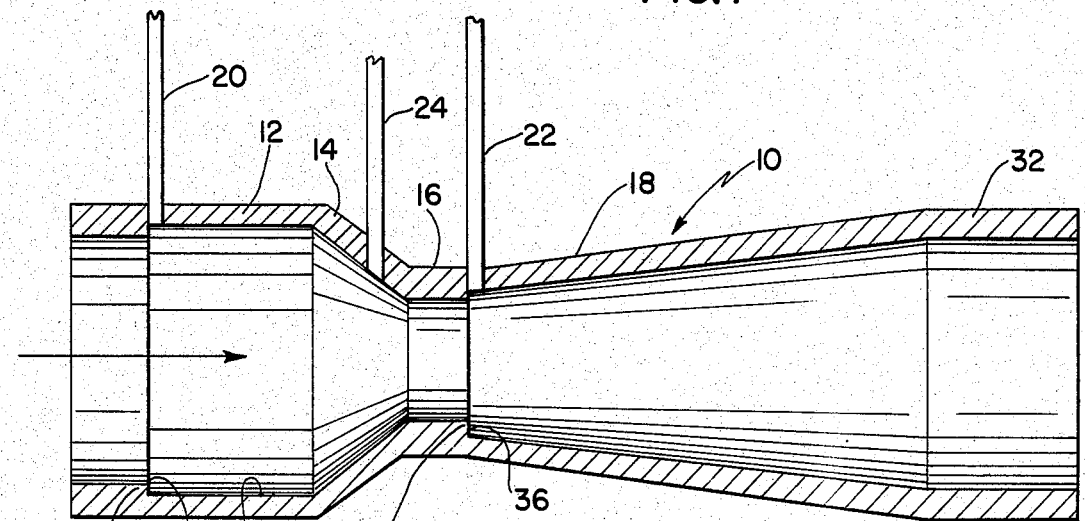
FIG. 2 is a sectional view taken along line 2—2 in FIG. 1.

Referring now to the drawings, a first embodiment of a flow measuring device of the instant invention is illustrated and generally indicated at 10 in FIGS. 1 and 2. The device 10 comprises an elongated shaped tubular member having an inlet section 12, a converging section 14, a throat section 16, and a downstream diverging section 18 which are sequentially disposed in a direction of downstream flow through the device 10. First and second pressure sensing taps 20 and 22, respectively, are provided for sensing the pressures in the inlet and throat sections 12 and 16, respectively; and in the preferred embodiment of the device, a third tap 24 is provided for sensing the pressure in the converging section 14. By monitoring the differential pressure between the first and second taps 20 and 22, respectively, it is possible to meter the flow of fluid passing through the device 10. In the alternative, when the device 10 is embodied with the third tap 24, a correlation between the pressure differential sensed between the first and second taps 20 and 22, respectively, and the pressure differential sensed between the first and third taps 20 and 24, respectively, can be determined, whereby the differential between the first and third taps 20 and 24, respectively, can be utilized to meter the flow of a fluid through the device 10.

The inlet section 12 is preferably formed with substantially straight walls which are substantial parallel to the axis of the device 10, and an inner annular recess 26 is provided in the downstream portion of the inlet section 12. The recess 26 is formed so that a shoulder 28 is provided in the inlet section 12 which preferably defines a substantially sharp leading edge 30 of the recess 26. The first pressure sensing tap 20 is operative for sensing the static pressure of a fluid in the inlet section 12 and is positioned so that it communicates with the interior of the inlet section 12 through the inner annular recess 26 therein. Preferably the tap 20 is positioned adjacent the leading edge 30 of the recess 26, as illustrated in FIG. 2, and, accordingly, as a fluid passes through the device 10 with a high velocity, the rapidly moving portions of the fluid do not impinge upon or engage the inner end of the tap 20, because it is, in effect, "shielded" from the rapidly moving portions of the fluid by the leading edge 30. Hence the tap 20 communicates only with slowly moving or substantially stationary portions of the fluid so that a true static pressure is sensed by the tap 20 and so that the configuration of the tap 20, particularly the inlet end thereof, has little or no effect on the pressure reading sensed by the tap 20.

The converging section 14 extends from the downstream end of the inlet section 12 and angles or is tapered inwardly so that the inside diameter of the converging section 14 is gradually reduced in a downstream direction, and accordingly, the velocity of the fluid passing through the device 10 is gradually increased in the converging section 14. The third pressure sensing tap 24 extends through the converging section 14 at a point intermediate the extent thereof. Since the tap 24 commnunicates directly with the interior of the converging section 14 and is not shielded by a recess in the manner of the first tap 20, fluid passing through the device 10 impinges on the inner end of the tap 24. Further, because of the angular configuration of the converging section 14, the momentum of the fluid has a direct effect on the pressure reading obtained from the tap 24. Specifically, the fluid has an aspirating or suction effect as it passes by the inner end of the third tap 24 whereby the reading produced by the tap 24 is actually less than the true static pressure of the fluid in the converging section 14. Further, it should be pointed out that since the tap 24 is directly exposed to the flow of the fluid in the device 10 so that the fluid impinges on the inlet end of the tap 24, the reading produced by the tap 24 is influenced by the configuration of the inner end thereof.

The throat section 16 extends from the downstream end of the converging section 14 in a direction substantially parallel to the axis of the device 10, and the downstream diverging section 18 extends from the downstream end of the throat section 16, terminating in a substantially straight downstream end portion 32. The downstream diverging section 18 is formed so that the walls thereof angle outwardly to define a diverging configuration of gradually increasing diameter for energy recovery in the device 10. In this regard, the velocity of a fluid passing through the device 10 is gradually decreased in the diverging section 18 so that the kinetic energy of the fluid is decreased and the potential energy thereof is correspondingly increased. By providing a gradual change in the cross section of the device 12 in the diverging section 18, the value of the potential energy of the fluid at the outlet end of the diverging section is preferably substantially equal to the value of the potential energy of the fluid entering the inlet section. Accordingly, the static pressure of the fluid leaving the device 10 approximates the static pressure of the fluid entering the device 10 in an ideal situation. The concept of maximizing energy recovery in this manner is generally known in the art and has been applied in a number of the heretofore available devices, including venturi tubes. The device 10, however, differs from the heretofore known devicves in the configuration of the area of transition from the throat section 16 to the downstream section 18. Specifically, the upstream end of the downstream section 18 is of somewhat greater dimension than the throat section 16 so that, in effect, an inner annular recess is defined by the diverging section 18 at the downstream end of the throat section 16. The upstream end of this recess is defined by a shoulder 34 at the intersection between the throat section 16 and the downstream section 18, and has a leading edge 36 which preferably makes a substantially sharp intersection with the inner wall of the throat section 16. The second tap 22 which is operative for sensing the pressure of the fluid in the throat section 16 is positioned within the recessed area of the diverging section 18 adjacent the leading edge 36. In this connection, although in the embodiment herein disclosed the tap 22 does not actually extend through the throat section 16, the tap 22 is positioned adjacent the downstream end of the throat section 16, and therefore it communicates in the interior of the throat section 16 for sensing a pressure which is substantially identical to that found in other areas of the throat section 16. It will be understood, however, that other embodiments of the instant invention in which throat section tap extend through recesses which are actually disposed in the throat section are contemplated. In any event, since the tap 22 in the device 10 is disposed within the annular recessed area defined by the downstream end of the throat section 16 and the upstream portion of the diverging section 18, it is operative for sensing a true static pressure in a manner similar to the tap 20 in the inlet section 12. Specifically, since the tap 22 is disposed in a recessed area, the fluid passing through the device 10 does not actually impinge on the inlet end of the tap 22, and, in fact, the fluid directly adjacent the inlet end of the tap 22 is either moving relatively slowly or is substantially stationary. Therefore, the precise configuration of the inlet end of the tap 22 is of little consequence, and a true static reading can be obtained with the tap 22.

For use of the device 10, a standard model of the device 10 of a particular dimension and configuration is calibrated utilizing a flow calibration determination. Thereafter, every other device of the same configuration and dimension can be bench calibrated with high accuracy from the initial flow calibration, and further flow calibrations are unnecessary. This results primarily from the fact that the taps 20 and 22 are recessed, and therefore the configurations of the inlet ends of the taps 20 and 22 have little or no significance in the discharge coefficient. Accordingly, machining irregularities or other variations in the configurations of the inlet ends of the taps 20 and 22 have no bearing on the pressures which are sensed in the inlet and throat sections 12 and 16, respectively. As a result, the device 10 can be manufactured substantially less expensively and with less precision while maintaining a high degree of accuracy for flow measurements. For operation of the device 10, the pressure differential between the first and second taps 20 and 22, respectively, is monitored, and the bench calibrated discharge coefficient for the device 10 is applied to determine the actual flow rate. The differential between the first and third taps 20 and 24, respectively, is also monitored, the differential between these taps always being greater than the differential between the first and second taps 20 and 24 because of the kinetic effect of the fluid on the third tap 24 which causes a reduced pressure to be sensed by the tap 24. By comparing the differential between the first and second taps 20 and 22, respectively, with the differential between the first and third taps 20 and 24, respectively, a discharge coefficient can be calculated for determining the flow rate through the device 10 using the differential between the first and third taps 20 and 24, respectively, so that this differential can then be used to meter the flow through the device 10. This provides the advantages of having an increased or magnified differential so that the flow rate can be monitored with greater sensitivity and accuracy. Despite the fact that the configuration of the inlet end of the tap 24 affects the reading obtained therefrom, the coefficient for the reading between the first and third taps 20 and 24 can be determined without a flow calibration, since the actual flow rate through the device 10 is already known from the differential between the first and second taps 20 and 22, respectively. Accordingly, the device 10 can be bench calibrated for operation with the first and third taps also. In actual operation, it is advantageous in some cases to monitor both the differential between the first and third taps 20 and 24, respectively, and the differential between the first and second taps 20 and 22, respectively. Specifically, by monitoring both differentials, it is possible to determine when the device 10 is malfunctioning or has become fouled or clogged in operation, since this will cause a change in the relationship between the two differentials.

Figure 3:
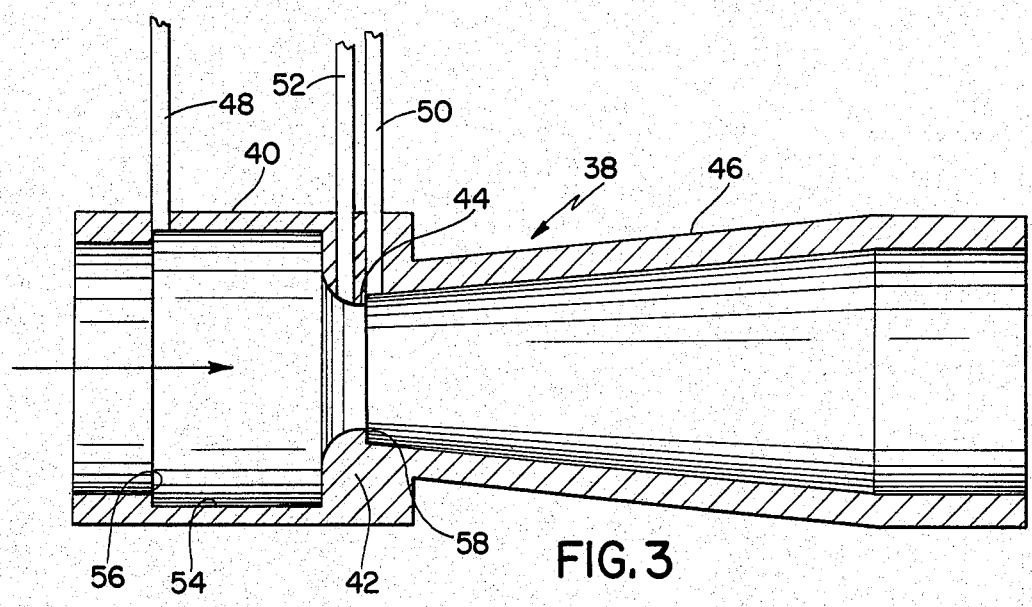
FIG. 3 is a sectional view of a second embodiment of the device.

A second embodiment of the device of the instant invention is illustrated in FIG. 3 and generally indicated at 38. The device 38 comprises an elongated shaped tubular member having an inlet section 40, a converging section 42, a throat section 44, and a downstream diverging section 46, which are sequentially disposed in a downstream direction of flow. First, second and third taps 48, 50 and 52 are provided in the device 38 for sensing the pressures in the inlet, throat, and converging sections, respectively. An inner annular recess 54 having a substantially sharp leading edge 56 is provided in the inlet section 40, and the first tap 48 communicates with the interior of the device 38 through the recess 54, preferably being positioned adjacent the sharp leading edge 56. The converging section 42, in contrast to the converging section 14 of the device 10, is of arcuately tapered configuration, and the throat section 44 is substantially defined by the point where the converging section 42 is substantially parallel to the axis of the device 38. The upstream end of the downstream diverging section 46 is recessed from the throat section 44 so that a recessed area is provided adjacent the throat section 44 having a substantially sharp leading edge 58. The second tap 50 is disposed in the diverging section 46 adjacent the leading edge 58 and hence communicates with the interior of the device 38 for sensing a pressure which is equal to that in the throat section 44 but which is not influenced by either the kinetic effects of the fluid in the device 38 or the configuration of the inlet end of the tap 50. The third tap 52 extends through the arcuate converging section 42 and is operative for sensing a pressure therein which is influenced by the dynamic effects of the fluid passing therethrough similar to the tap 24 in the device 10. In operation of the device 38, the differentials between the first and second taps 48 and 50, respectively, and between the first and third taps 48 and 52, respectively, are monitored, and these differentials can be used to accurately meter the flow of a fluid through the device 38 using discharge coefficients determined in the manner hereinabove described for the device 10.

Figure 4:
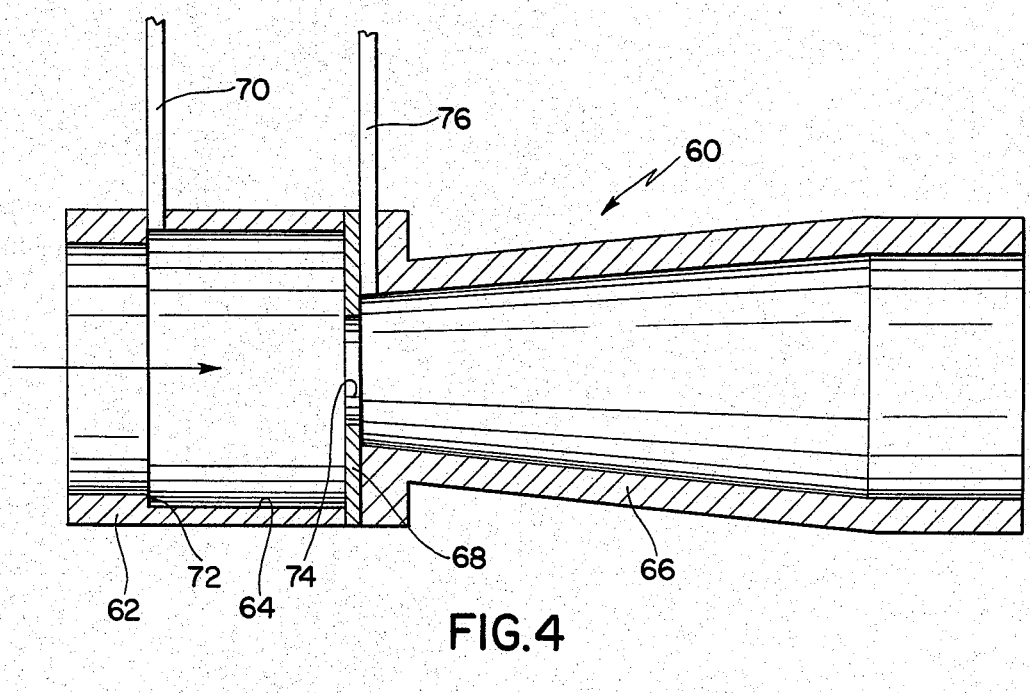
FIG. 4 is a sectional view of a third embodiment thereof.

A third embodiment of the flow metering device of the instant invention is illustrated in FIG. 4 and generally indicated at 60. The device 60 comprises a shaped tubular member having an inlet section 62 with an inner annular recess 64 and a downstream diverging section 66 which are sequentially disposed in a downstream direction of flow. An orifice plate 68 is also provided in the device 60 and is interposed between the inlet section 62 and the downstream diverging section 66. The inlet section 62 is similar to the inlet sections 12 and 40 of the devices 10 and 38, respectively, and a first tap 70 extends through the recess 64 adjacent the upstream end thereof, which upstream end preferably has a substantially sharp leading edge 72. The orifice plate 68, in effect, defines the converging and throat sections of the device 60 and has an orifice 74 therethrough. The upstream end of the downstream diverging section 66 is recessed relative to the orifice 74, and a second pressure tap 76 extends through the diverging section 68 adjacent the orifice plate 68. The device 60 is operative for monitoring differential pressures between the first and second taps 70 and 76 thereof for metering the flow of a fluid through the device 60. Obviously, since the converging and throat sections of the device 60 are defined by the orifice plate 68, a third pressure sensing tap is not included in the device 60, and hence it is not possible to monitor the flow of fluid through the device 60 with a magnified differential in the manner hereinabove described for the devices 10 and 38. However, the advantages of using recessed taps as described for the devices 10 and 38 also apply to the device 60. Specifically, the precise configurations of the inlet ends of the taps 70 and 76 do not affect the static pressure readings thereby obtained, since they are disposed in recessed areas and therefore are operative for sensing true static pressures. Hence, each individual device 60 does not need to be flow calibrated and can be bench calibrated from a known discharge coefficient.

It is seen, therefore, that the instant invention provides a significant advancement in the flow metering art. Specifically, it has been found that it is possible to obtain highly accurate flow measurements with bench calibrated devices constructed in accordance with the instant invention. This results from the fact that the pressure sensing taps of the devices which are operative for sensing the pressures in the respective inlet and throat sections thereof are in recessed areas, and hence the readings obtained from the taps are not influenced by the configurations of the taps or by kinetic effects of the fluid, and therefore the taps provide true static pressure readings. Accordingly, it is possible to manufacture flow metering devices which can be operated accurately with bench calibrated discharge coefficients. Further, flow metering devices constructed in accordance with the instant invention do not require precision machining in the pressure tap areas thereof, since the effects of irregularities in these areas are eliminated. In addition, in the devices 10 and 38, it is possible to operate with magnified differentials utilizing bench calibrated discharge coefficients. For all of these reasons, as well as the other reasons hereinabove set forth, it is seen that the device of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and describedexcept insofar as indicated by the scope of the appended claims.

What is claimed is:

1. A flow metering device comprising a shaped tubular member having sequentially disposed inlet, converging, throat, and downstream diverging sections, said tubular member having first and second inner annular recesses therein, and first and second pressure taps which communicate with the interior of said tubular member through said first and second inner annular recesses, respectively, for sensing the presssures in said inlet and throat sections, respectively, said first and second taps being oriented and said recesses being formed so that said taps are substantially shielded from impingement thereon by a fluid passing through said device, whereby said first and second taps are operative for sensing substantially static pressures in said inlet and throat sections, respectively.

2. In the metering device of claim 1, at least one of said annular recesses further characterized as having a substantially sharp leading edge, the tap communicating with the interior of said tubular member through said recess with said substantially sharp leading edge being disposed adjacent said sharp leading edge.

3. In the metering device of claim 1, both of said annular recesses further characterized as having substantially sharp leading edges, both of the taps communicating with the interior of said tubular member through said recesses being disposed adjacent the leading edges of the respective recesses.

4. In the metering device of claim 1, the portions of said tubular member immediately preceding both of said annular recesses being substantially straight and substantially parallel to the axis of said tubular member.

5. In the metering device of claim 1, said converging and throat sections being defined by an orifice plate, the orifice in said orifice plate being of substantially smaller dimension than the interior dimension of said downstream diverging section, said throat section pressure sensing tap being disposed in said downstream diverging section adjacent said orifice plate and hence being recessed relative to said orifice.

6. In the device of claim 1, said converging section being of tapered configuration, said device further characterized as having a third pressure tap therein for sensing the fluid pressure in said converging section.

* * * * *